US008221630B2

(12) United States Patent
Scheel et al.

(10) Patent No.: US 8,221,630 B2
(45) Date of Patent: Jul. 17, 2012

(54) PROCESS FOR DEWATERING A HYDRAULIC FLUID

(75) Inventors: Ingo Scheel, Buxtehude (DE); Ralf Pohlmann, Harsefeld (DE); Wolfgang Erdmann, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/827,300

(22) Filed: Jun. 30, 2010

(65) Prior Publication Data

US 2011/0017672 A1 Jan. 27, 2011

Related U.S. Application Data

(63) Continuation of application No. PCT/EP2008/068193, filed on Dec. 22, 2008.

(60) Provisional application No. 61/009,967, filed on Jan. 4, 2008.

(30) Foreign Application Priority Data

Jan. 4, 2008 (DE) ......................... 10 2008 003 179

(51) Int. Cl.
*B01J 49/00* (2006.01)
*C02F 1/42* (2006.01)

(52) U.S. Cl. ......................... 210/670; 210/675; 210/676

(58) Field of Classification Search .................. 210/670, 210/675, 676
See application file for complete search history.

(56) References Cited

U.S. PATENT DOCUMENTS

| | | | | |
|---|---|---|---|---|
| 3,753,898 | A | | 8/1973 | Glavis |
| 4,237,002 | A | * | 12/1980 | Strudgeon et al. ............ 210/631 |
| 4,609,458 | A | * | 9/1986 | Okamura et al. ............... 210/85 |
| 4,726,818 | A | | 2/1988 | Yeung et al. |
| 4,795,556 | A | * | 1/1989 | Brotea et al. ..................... 210/94 |
| 4,966,611 | A | * | 10/1990 | Schumacher et al. ............ 95/18 |
| 5,325,066 | A | * | 6/1994 | Way et al. ...................... 324/664 |
| 5,464,551 | A | | 11/1995 | Deetman |
| 5,942,121 | A | * | 8/1999 | Pantich ......................... 210/664 |

(Continued)

FOREIGN PATENT DOCUMENTS

DE 4420067 A1 12/1995

(Continued)

OTHER PUBLICATIONS

German Office Action for DE 10 2008 003 179.8 dated Sep. 23, 2008.

(Continued)

*Primary Examiner* — Chester Barry
(74) *Attorney, Agent, or Firm* — Jenkins, Wilson, Taylor & Hunt, P.A.

(57) ABSTRACT

The present invention provides a method and a device for dewatering a hydraulic fluid of a hydraulic system, in particular in the aerospace sector, comprising a container which has a sorbent, a feed which supplies the hydraulic fluid from the hydraulic system to the container for the hydraulic fluid to be passed through the sorbent such that it can be dewatered in a dewatering mode of the device, and a return which returns the dewatered hydraulic fluid from the container to the hydraulic system in the dewatering mode of the device. The hydraulic fluid can be dewatered continuously and very efficiently by the method and the device according to the invention.

7 Claims, 3 Drawing Sheets

U.S. PATENT DOCUMENTS

| | | | | |
|---|---|---|---|---|
| 6,398,966 | B1 * | 6/2002 | Smith et al. | 210/691 |
| 6,402,810 | B1 * | 6/2002 | Mayer et al. | 95/46 |
| 6,500,338 | B2 * | 12/2002 | Baah | 210/266 |
| 6,517,725 | B2 * | 2/2003 | Spearman et al. | 210/640 |
| 6,609,411 | B1 | 8/2003 | Taylor et al. | |
| 6,746,610 | B2 * | 6/2004 | Manz et al. | 210/689 |
| 6,972,089 | B2 * | 12/2005 | Leathers | 210/195.1 |
| 7,033,493 | B2 | 4/2006 | McGarvey et al. | |
| 7,846,342 | B2 * | 12/2010 | Johnson et al. | 210/774 |
| 2002/0118364 | A1 * | 8/2002 | Amonette et al. | 356/436 |
| 2006/0196821 | A1 | 9/2006 | Selsdon | |
| 2008/0099400 | A1 * | 5/2008 | Nemser et al. | 210/638 |
| 2011/0168610 | A1 | 7/2011 | Scheel et al. | |

FOREIGN PATENT DOCUMENTS

| | | | |
|---|---|---|---|
| DE | 19605433 | A1 | 8/1997 |
| DE | 69 318 555 | T2 | 12/1998 |
| DE | 10252148 | B3 | 2/2004 |
| WO | WO 99/056871 | | 11/1999 |
| WO | WO 2005/092465 | A2 | 10/2005 |

OTHER PUBLICATIONS

International Search Report and Written Opinion for PCT/EP08/068193 dated Apr. 9, 2009.

Non-Final Office Action with for U.S. Appl. No. 13/071,032 dated Jun. 17, 2011.

Final Office Action with for U.S. Appl. No. 13/071,032 dated Dec. 5, 2011.

"Skydrol® Type IV Fire Resistant Hydraulic Fluids LD-4/500B-4", Technical Bulletin, Solutia Inc., Pub. No. 7249153C, 2003.

Wierling, Reinhard Von Dipl.-Ing, "Spontane Erkennung von Wasser and die sofortige Entfernung aus der Hydraulikflüssigkeit" Mahle Filtersysteme GmbH Sonderdruck aus AGT Mar. 2001. (With Google machie translation attached).

"Stability of Phospate Ester Aviation Hydraulic Fluids," Technical Bulletin, ExxonMobil Corp., 2008.

* cited by examiner 105
93
80
3
40

62
83
86
98
52
34
84
10
47
46
81
82
87
39
35
63
85
95
96
93
97
106
104
103
102
94
99
80
3

PROCESS FOR DEWATERING A HYDRAULIC FLUID

CROSS-REFERENCE TO RELATED APPLICATIONS

This application is a continuation of PCT/EP2008/068193 filed Dec. 22, 2008 and claims the benefit of U.S. Provisional Application No. 61/009,967, filed Jan. 4, 2008 and German Patent Application No. 10 2008 003 179.8, filed Jan. 4, 2008, the entire disclosures of which are herein incorporated by reference.

FIELD OF THE INVENTION

The present invention relates to a method for dewatering a hydraulic fluid, in particular in the aerospace sector, and to a device for implementing a method of this type. Furthermore, the invention relates to a unit for dewatering a hydraulic fluid of a hydraulic system, to a method for controlling a unit of this type, to an aircraft or spacecraft with a device or unit of this type and to a floor maintenance machine with a device or unit of this type.

Although the present invention and the problem on which it is based can be applied to any vehicles, they will be described in detail in respect of an aircraft.

The hydraulic fluid used in aircraft hydraulic systems is typically very hygroscopic. The increasing water content, due to the uptake of water, in the hydraulic fluid results in the formation of acids as well as in other undesirable chemical changes. When there is a specific water content, valves and pumps can suffer from corrosive damage which cannot be tolerated in view of the particular safety requirements imposed in air transport.

One possibility of avoiding the problems associated with an increasing water content is to completely replace the hydraulic fluid. However, this is expensive, entails long aircraft immobilisation times and necessitates a separate disposal of the replaced hydraulic fluid.

DE 10252148 B3 discloses a method and a device for dewatering a hydraulic fluid according to the preamble of claims 1 and 8 of the present invention. In the known method, water is separated from the hydraulic fluid by pervaporation on a membrane which is permeable to gas and water and impermeable to the hydraulic fluid, the membrane being charged on the permeate side with a rinsing gas stream of a water vapour partial pressure which is lower than in the hydraulic fluid.

A disadvantage of the known method is that the dewatering procedure can only be carried out relatively slowly.

SUMMARY OF THE INVENTION

Therefore, the object of the present invention is to provide an improved possibility of dewatering a hydraulic fluid, with the provision in particular of a rapid dewatering of large quantities of hydraulic fluid.

This object is achieved by a method which has the features of claim 1 and/or by a device with the features of claim 8.

According thereto, a method is provided for dewatering a hydraulic fluid, in particular in the aerospace sector, the hydraulic fluid being passed through a sorbent which removes water from the hydraulic fluid.

A sorbent which is brought into direct contact with the hydraulic fluid removes water from the hydraulic fluid significantly faster than is possible by the membrane separating method known from the prior art.

Furthermore, a device is provided for dewatering a hydraulic fluid of a hydraulic system, in particular in the aerospace sector, comprising a container, a feed and a return. The container has a sorbent. The feed supplies the hydraulic fluid from the hydraulic system to the container such that the hydraulic fluid can flow through the sorbent for the hydraulic fluid to be dewatered in a dewatering mode of the device. The return guides the dewatered hydraulic fluid from the container back to the hydraulic system in the dewatering mode of the device.

This simply constructed solution makes it possible to bring a hydraulic fluid into contact with a sorbent, the hydraulic fluid flowing through the sorbent and thus the hydraulic fluid being continuously dewatered. The advantages which have already been mentioned apply accordingly.

Furthermore, a unit for dewatering a hydraulic fluid of a hydraulic system, in particular in the aerospace sector, with at least two of the devices according to the invention is provided. According to a method for controlling the unit of the invention, the devices are only switched alternately into the regenerating mode by a common control means.

Here, by "only" it is meant that the devices are never in the regenerating mode at the same time. The advantage of this feature is that the hydraulic fluid can be dewatered in an uninterrupted and rapid manner.

In addition, an aircraft or spacecraft with the device according to the invention or with the unit according to the invention is provided.

With an aircraft or spacecraft of this type, there is no appreciable increase in the water content of the hydraulic fluid due to the continuous dewatering by the device or the unit. Consequently, the immobilisation times of the aircraft or spacecraft are considerably reduced.

Furthermore, a floor maintenance machine with the device according to the invention or with the unit according to the invention is provided, it being possible for the floor maintenance machine to be connected to a hydraulic system of an aircraft or spacecraft for dewatering the hydraulic fluid.

A floor maintenance machine of this type can avoid the entrainment of additional components in the aircraft or spacecraft, which advantageously entails a reduction in the flying weight.

Advantageous embodiments and developments of the invention are provided in the subclaims.

According to a preferred development, the water content of the hydraulic fluid is determined before and/or after the hydraulic fluid has passed through the sorbent.

By means of the water content in the hydraulic fluid, it is possible to detect whether the sorption capacity of the sorbent is exhausted, i.e. the sorbent is no longer capable of absorbing water or absorbing water in an adequate amount per unit of time.

According to another preferred embodiment, if the measured water content, in particular the water content after the hydraulic fluid has passed though the sorbent, is above a first limiting value, a regenerating mode is initiated to regenerate the sorbent.

In particular, the water content is to be measured after the hydraulic fluid has passed through the sorbent, since then it can be clearly and immediately established whether the sorbent still has an adequate sorption capacity.

For example, the first limiting value can correspond to 0.5% water content in the hydraulic fluid which is the maximum value permitted in aviation. A method of this type can be implemented very easily in terms of control. The first limiting value is preferably set slightly below the 0.5% limit, for example at 0.3% or 0.4%, so that the water content in the hydraulic fluid never rises above the predetermined 0.5% limit, even during the regeneration of the sorbent.

The term "regenerating mode" as used herein combines the types of operation required for a resumption of the dewatering mode after it has been established that the sorption capacity of the sorbent is exhausted. For a resumption of the dewatering mode, it is necessary to restore the sorption capacity of the sorbent.

As will become clear from the following explanations, there are a total of five possible different types of operation of the device: the device can be in dewatering mode or regenerating mode. In turn, the regenerating mode is divided into an emptying operation, re-drying operation, filling operation and/or cleaning operation.

According to a further development, if the value of the difference of the measured water content before and after passage of the hydraulic fluid through the sorbent is below a second limiting value, the second limiting value being determined before or after the passage as a function of the measured water content, a regenerating mode is initiated to regenerate the sorbent.

The value of the difference indicates to what extent the sorption capacity of the sorbent is exhausted. For example, if the sorption capacity is already substantially exhausted, the value of the difference will be correspondingly small, but only if a certain water content is present in the hydraulic fluid; when there is a very low water content in the hydraulic fluid, the value of the difference must inevitably be small. This improvement of the method takes these facts into consideration, the second limiting value being determined as a function of the measured water content.

According to the development described above, it is possible to detect early on whether the sorbent will have to be replaced in the near future.

In a further preferred development, in the regenerating mode the sorbent is separated from the hydraulic fluid and is re-dried. The term "re-drying" as used herein is understood as meaning the removal of the water which is absorbed in the sorbent.

According to a further preferred embodiment, the sorbent is re-dried by heat and/or by reduced pressure. These are very simple measures for re-drying the sorbent.

In a further preferred embodiment, the re-drying procedure is carried out at least by reduced pressure and the end of the re-drying procedure is determined by the pressure falling below the limiting value for the change in pressure.

When the pressure falls below the limiting value, it is then established that a sufficient amount of water has been removed from the sorbent in order to restore the sorption capacity thereof.

In a further preferred development, the degree of contamination of the hydraulic fluid is measured and, when the degree of contamination exceeds a contamination limiting value, the sorbent is rinsed with a cleansing agent, after being re-dried, to remove particles of dirt from the sorbent.

Not only the absorption of water, but also the incorporation of particles of dirt in the sorbent can impair the sorption capacity of the sorbent. For this reason, when the sorbent is correspondingly contaminated with particles of dirt, it has to be cleaned. In the decision whether the sorbent is to be cleaned, the period of time over which the contamination limiting value has been exceeded can also be considered. This provides an indication of the amount of dirt incorporated in the sorbent.

In a further preferred embodiment, the hydraulic fluid is passed through the sorbent again after the regenerating mode.

Thus, the original state is restored, and the device can answer its purpose, namely the dewatering of the hydraulic fluid.

In a further preferred development, the sorbent is selected from the group consisting of silica gel, sepiolite and molecular sieve, and/or the hydraulic fluid is based on phosphate ester.

Phosphate ester is a hydraulic fluid widespread in aviation. The sorbents can advantageously have geometries with large surfaces to thus achieve a high sorption capacity.

According to a preferred development, provided in the feed and/or in the return are moisture sensors for measuring the water content in the hydraulic fluid and a control means is also provided which is connected in terms of signalling to the moisture sensors.

Of course, the moisture sensors could also be provided in the hydraulic system itself, however for specific applications of the device, particularly in connection with a floor maintenance machine, this is unfavourable, because it would require the provision of such sensors in every aircraft, instead of a one-off provision of such sensors in the floor maintenance machine.

Moisture sensors of this type are preferably based on a capacitive measurement, particularly also bearing in mind the temperature of the hydraulic fluid.

In a further preferred embodiment, the control means switches the device out of the dewatering mode into a regenerating mode to regenerate the sorbent when the measured water content, in particular the water content in the return, is above a first limiting value.

According to a further preferred development, the control means switches the device out of the dewatering mode into a regenerating mode to regenerate the sorbent when the value of the difference of the water content in the feed and in the return is below a second limiting value, the control means determining the second limiting value as a function of the measured water content in the feed or in the return.

According to a further preferred embodiment, the container is coupled with the feed by a feed valve and is coupled with the return by a return valve. The hydraulic fluid in the container can thus be controlled in a flexible manner.

The feed valve is preferably provided at an upper end of the container and the return valve is preferably provided at a lower end of the container, "upper" and "lower" relating to the ground.

In a further preferred embodiment, the container is coupled with a compressed air line by a compressed air valve, the control means closing the feed valve and opening the return valve in an emptying operation of the regenerating mode, the compressed air discharging the hydraulic fluid out of the container into the return through the open return valve.

An emptying procedure of this type can be realised in a simple manner and it takes place very rapidly.

As used herein, the term "closed" valve is understood as meaning a state in which the valve prevents the fluid from flowing through it and the term "open" valve is understood as meaning a state in which the valve allows the fluid to flow through it.

In a further preferred embodiment, the control means again closes the compressed air valve in the emptying operation when a filling level sensor which is connected in terms of signalling to the control means indicates that the hydraulic fluid has been emptied out of the container.

This measure prevents compressed air from being pressed into the return, as a result of which it could pass into the hydraulic system and cause damage therein.

In a further preferred embodiment, the container is coupled with a vacuum line by a vacuum valve, the control means closing the return valve in a re-drying operation, downstream of the emptying operation, of the regenerating mode and opening the vacuum valve, the vacuum which then prevails in the container re-drying the sorbent.

The "vacuum" is nothing more than the reduced pressure which has already been described in connection with the method. The vacuum prevailing on the sorbent leads to the evaporation of the water absorbed in the sorbent, the water vapour resulting therefrom being removed via the vacuum valve.

In a further preferred development, the container is coupled with a vent line by a ventilating valve, with a heating means being provided, the control means closing the return valve in a re-drying operation, downstream of the emptying operation, of the regenerating mode, opening the ventilating valve and connecting the heating means for supplying heat to the sorbent to re-dry the sorbent.

The supply of heat to the sorbent for evaporating the water absorbed in said sorbent is an additional or alternative possibility for re-drying the sorbent to the embodiment which has already been described, in which the sorbent is re-dried by applying a vacuum. Both embodiments are advantageously used at the same time, in which case at least the amount of heat is supplied by the heating means which is removed from the sorbent during the evaporation process. In this respect, the ventilating valve can serve simultaneously as a vacuum valve and correspondingly the vent line can serves as a vacuum line. Thus, the re-drying procedure can take place very efficiently and it is possible to economise on components.

According to a further preferred embodiment, the container is coupled with a vent line by means of a ventilating valve, the control means opening the ventilating valve and the feed valve so that the container can be filled with hydraulic fluid in a filling operation, downstream of the re-drying operation, of the regenerating mode.

In order to switch the device back into the dewatering mode, it is necessary for the feed valve to be opened, thereby enabling hydraulic fluid to again flow into the container. However, for this, the air in the container must be able to escape. This can take place through the open ventilating valve. The feed valve must finally be re-opened to allow the hydraulic fluid to re-flow out of the hydraulic system into the container with the sorbent and out of the container again through the return into the hydraulic system.

According to a further preferred development, in the filling operation, the control means re-closes the ventilating valve and opens the return valve when a filling level sensor which is coupled in terms of signalling with the control means indicates a desired filling level. Then the control means again switches the device from the regenerating mode into the dewatering mode.

This embodiment prevents hydraulic fluid from flowing into the ventilating line. Instead, it can be shut off immediately when the container has been adequately filled with hydraulic fluid. Thereafter, it is possible to resume the dewatering mode.

In a further preferred embodiment, a contamination sensor is provided which measures a degree of contamination of the hydraulic fluid and makes this measurement available to the control means, the container being coupled with a cleansing agent feed by a cleansing agent feed valve and being coupled with a cleansing agent return by a cleansing agent return valve, the control means switching the device into a cleaning operation to remove contamination from the sorbent after the re-drying operation and before the filling operation when the control means establishes that the degree of contamination exceeds a contamination limiting value, in which case the control means closes the vacuum valve and/or the ventilating valve and opens the cleansing agent feed valve and cleansing agent return valve, the cleansing agent then flowing through the sorbent and, in so doing, removing contamination therefrom.

According to a further preferred development, the cleansing agent feed and the cleansing agent return are coupled with a cleaning container, and a cleansing agent pump and a filter are provided for cleaning the cleansing agent, the cleansing agent pump circulating the cleansing agent through the container, the cleansing agent return, the cleansing agent container, the filter and the cleansing agent feed in the cleaning operation, with the filter filtering contamination out of the cleansing agent.

Thus, contamination can be easily removed from the sorbent, the contamination itself being collected in a filter.

The filter is preferably provided with a contamination indication and is preferably provided to be replaceable. This makes it possible to replace the filter as soon as it is contaminated.

According to a further preferred development, the cleansing agent container has a ventilation, the control means closing the cleansing agent return valve and opening the compressed air valve in the cleaning operation after circulation of the cleansing agent for the discharge thereof from the container, the compressed air discharging the cleansing agent into the cleansing agent feed and compressed air escaping out of the cleansing agent container via the ventilation.

The cleansing agent is removed very quickly from the container by compressed air. The excess pressure resulting thereby in the cleansing agent circulation, since the cleansing agent circulation is interrupted by the closed cleansing agent return valve, can advantageously escape via the ventilation.

In a further preferred embodiment, the cleansing agent pump and the filter are arranged in the cleansing agent feed or in the cleansing agent return, a cleansing agent discharge line being provided with a cleansing agent discharge valve which bypasses the cleansing agent pump and/or the filter, and to empty the container, the control means opens the cleansing agent discharge valve and shuts off the cleansing agent feed valve or the cleansing agent return valve.

This embodiment allows the cleansing agent to be discharged very rapidly from the container, because it does not have to flow through the cleansing agent pump or the filter which constitute a high flow resistance. Furthermore, a flow through the filter in the opposite direction could result in the contaminant particles, trapped in the filter, being distributed in the cleansing agent circulation.

In a further preferred embodiment, a cleansing agent contamination sensor is provided which measures a degree of contamination of the cleansing agent and makes this measurement available to the control means, the control means supplying a warning signal to an indicator when the degree of contamination of the cleansing agent exceeds a cleansing agent contamination limiting value. Thus, it can be ensured that the cleansing agent is replaced when it is itself contaminated. For specific types of contamination, it is quite possible that the filter is not capable of adequately cleaning the cleansing agent, particularly in the case of fluidic contamination in the cleansing agent.

According to a preferred development of the unit according to the invention, four of the devices, for example devices A, B, C and D are provided, the common control means of which only switch them alternately into the dewatering mode, emptying operation, re-drying operation and filling operation.

In other words, when device A is in the dewatering mode, device B is in emptying operation, device C is in re-drying operation and device D is in filling operation. Thus, the required amount of sorbent per container can be minimised, since the amount of sorbent provided in each container must last just as long as the longest operation lasts (emptying operation, re-drying operation or filling operation). It is thus possible to minimise the size of the containers.

BRIEF DESCRIPTION OF THE DRAWINGS

In the following, the invention will be described in detail on the basis of embodiments with reference to the accompanying figures of the drawings.

In the figures.

In the figures, the same reference numerals denote the same or functionally identical components, unless indicated otherwise.

DESCRIPTION OF EXEMPLARY EMBODIMENTS

Figure 1:
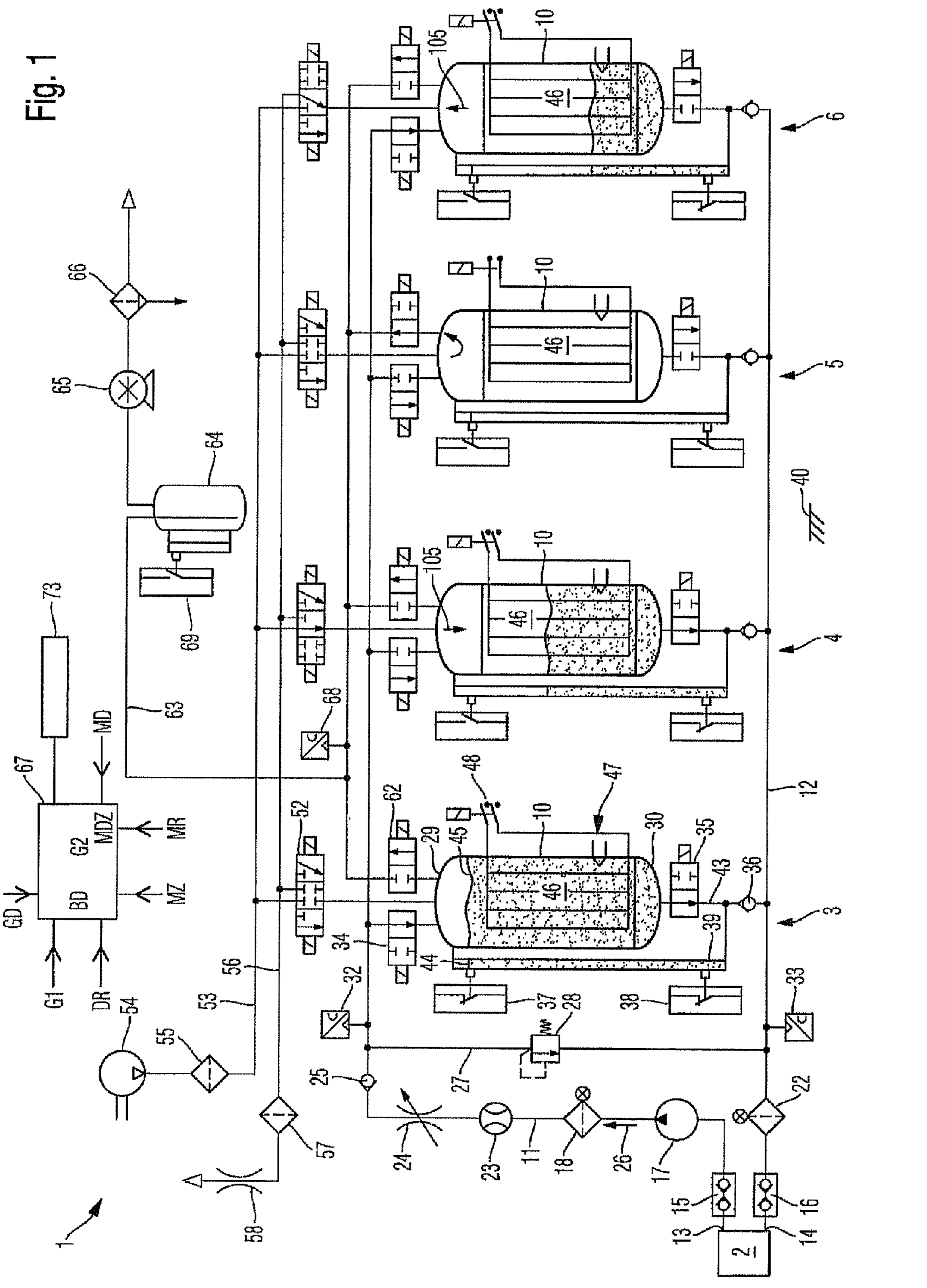
FIG. 1 shows a unit with four devices according to an embodiment of the present invention.

FIG. 1 schematically shows a unit 1 for dewatering a hydraulic fluid of a hydraulic system 2, for example the hydraulic system of an aircraft. In the case of the present embodiment, the hydraulic fluid is a phosphate ester.

The unit 1 is preferably a component of a floor maintenance machine, as typically found in airports.

The unit 1 has a first device 3, a second device 4, a third device 5 and a fourth device 6. Each of the devices 3 to 6 has a container 10, all the containers 10 being fluidically coupled with the hydraulic system 2 by a common feed 11 and a common return 12.

The unit 1 is coupled with the hydraulic system 2, for example during maintenance of the aircraft with the hydraulic system 2 and is of a temporary nature, i.e. the connection 13 of the feed 11 and the connection 14 of the return 12 to the hydraulic system 2 are configured to be detachable.

Arranged in the feed 11 and in the return 12, downstream of the connections 13 and 14 are in each case stop valves 15, 16 which are each opened after the unit 1 has been coupled with the hydraulic system 2 and are closed before the unit 1 is uncoupled from the hydraulic system 2. This prevents residual hydraulic fluid from issuing out of the unit 1 after the uncoupling of the hydraulic system 2.

A hydraulic pump 17 which pumps the hydraulic fluid through the unit 1 is preferably arranged downstream of the stop valve 15 in the feed 11.

A filter 18 with a contamination indication is preferably arranged in the feed 12 downstream of the hydraulic pump 17. A corresponding filter 22 with a contamination indication is also preferably arranged in the return 12 downstream of the stop valve 16. The filters 18, 22 filter contamination particles out of the hydraulic fluid. If the contamination indications of the filters 18, 22 indicate that said filters 18, 22 are contaminated, they can be replaced.

A flow sensor 23 is preferably provided in the feed 11 downstream of the filter 18. The flow sensor 23 can establish whether and how much hydraulic fluid is flowing through the unit 1.

Connected to the flow sensor 23 in the feed 11 is preferably an adjustable pressure reducing valve 24 which can adjust the pressure in the hydraulic fluid which is supplied to the containers 10.

A nonreturn valve 25 connected to the pressure reducing valve 24 in the feed 11 prevents the hydraulic fluid from flowing against the direction of flow provided with reference numeral 26 in the feed 11.

The feed 11 downstream of the nonreturn valve 25 preferably has a safety line 27, connecting this to the return 12, with a safety valve 28. In the normal state, the safety valve is in the position shown in FIG. 1, in which it prevents hydraulic fluid from flowing from the feed 11 into the return 12 through the safety line 27. However, if an error then occurs which prevents the hydraulic fluid from flowing from the feed 11 through the container 10 into the return 12, but the pump 17 is still subsequently supplying hydraulic fluid, the safety valve 28 is opened if a specific limiting value for the permissible hydraulic fluid pressure is exceeded and the hydraulic fluid can then flow away from the feed 11 into the return 12. Thus, damage to lines and valves, for example can be prevented.

Downstream of the filters 18 and 22, the feed 11 and the return 12 preferably have a respective moisture sensor 32 and 33 which measure the water content in the hydraulic fluid.

Figure 2:
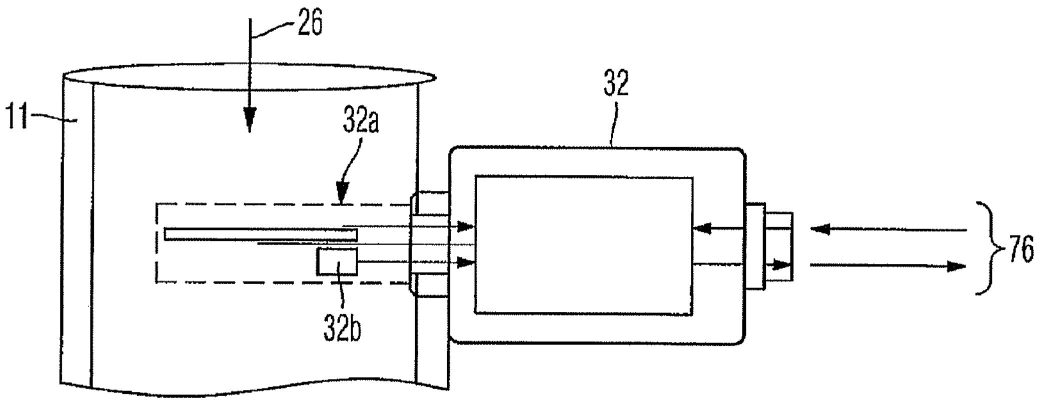
FIG. 2 shows a moisture sensor according to the embodiment.

FIG. 2 shows by way of example one of the moisture sensors 32, 33 which projects with its moisture probe 32*a* into the feed 11 and there capacitively measures the moisture of the hydraulic fluid. The moisture sensor is also equipped with a temperature probe 32*b* which provides a temperature of the hydraulic fluid. The measured temperature is incorporated in the determination of moisture of the hydraulic fluid.

According to the present embodiment, only two moisture sensors 32, 33 are arranged in the feed 11 respectively in the return 12. In the same way, it is possible for each of the devices 3 to 6 to have two moisture sensors, one of which is provided upstream and the other is provided downstream of the container 10, so that the water content can be individually determined upstream of and downstream of each container 10 for each of the devices 3 to 6. However, the variant shown in FIG. 1 is relatively economical in terms of parts, since it manages with only two moisture sensors 32, 33.

The devices 3 to 6 are configured identically. For this reason, in the following the construction thereof will be described by way of example with reference to device 3.

The container 10 is configured as a cartouche, i.e. as a cylindrical container which extends substantially vertically to the ground 40 (not shown further). In the following, "upper" and "lower" always relate to the ground 40.

At its upper end 29, the container 10 is fluidically coupled with the feed 12 by a feed valve 34 configured as an electromagnetically actuatable 2/2 directional control valve and at its lower end 30, it is fluidically coupled with the return 12 by a return valve 35 configured as an electromagnetically actuatable 2/2 directional control valve.

In the open position of the feed valve 34 and of the return valve 35, shown in FIG. 1 for device 3, hydraulic fluid can flow from the feed 12 into the container 10 and out of said container 10 again into the return 12.

In the closed position of the feed valve 34 and of the return valve 35, shown in FIG. 1 for device 5, hydraulic fluid cannot flow either from the feed 11 into the container 10, or from the container 10 into the return 12.

Arranged between the return valve 35 and the return 12 is preferably a nonreturn valve 36 which prevents hydraulic fluid from flowing out of the return 12 into the container 10 at any time. This prevents a mutual influencing of the containers 10 of the devices 3 to 6. In particular, the nonreturn valve 36 seals off a container 10 which is in emptying operation, described in detail later on, from the pressurised hydraulic fluid in the return 12.

Provided on the container 10 are an upper filling level sensor 37 and a lower filling level sensor 38 which generate a signal when the filling level in the container 10 falls below a first limiting value or when a filling level in the container 10 exceeds a second limiting value. The filling level sensors 37 and 38 are preferably arranged on a measuring column 39, the lower end of which is fluidically connected to a line 43 connecting the return valve 35 to the return 12 and the upper end of which is connected to the upper end of the container 10.

A level 44 of the hydraulic fluid in the measuring column 39 corresponds to the level 45 of the hydraulic fluid in the container. According to the present embodiment, the lower filling level sensor 38 only generates a signal when the line 43 is at least partly empty so that the level 44 in the measuring column falls below the position of the filling level sensor 38. This ensures that the filling level sensor 38 only generates a signal when the container 10 is completely empty.

In its interior, the container 10 has a sorbent 46, for example a silica gel. The sorbent 46 is capable of removing water out of the hydraulic fluid.

Furthermore, the container 10 has a heating means 47 which is configured, for example as heating elements, through which current flows when an electromagnetic switch 48 is closed and the heating elements generate heat which heats the sorbent 46.

At its upper end 29, the container 10 can be fluidically coupled with a compressed air line 53 by a compressed air valve 52 configured as an electromagnetically actuatable 3/3 directional control valve. The compressed air line 53 can be charged with filtered compressed air by a compressor 54 and a filter 55 connected downstream.

Furthermore, the container 10 can be fluidically coupled with a vent line 56 by the compressed air valve 52, the vent line 56 having a filter 57 and a ventilation 58 at which atmospheric pressure prevails.

The compressed air valve 52 has a first position in which the container 10 is not coupled with the compressed air line 53 or with the vent line 56. In a second position, the container 10 is coupled with the compressed air line 53. In a third position of the compressed air valve 52, the container 10 is coupled with the vent line 56.

Furthermore, the upper end 29 of the container 10 can be fluidically coupled with a vacuum line 63 by a vacuum valve 62 configured as a 2/2 directional control valve, the vacuum line 63 preferably having in the following sequence: a settling container 64, a vacuum pump 65 and preferably a water separator 66. The settling container 64 protects the pump from solid and liquid constituents. The vacuum pump 65 can charge the vacuum line 63 with a vacuum (based on atmospheric pressure).

The vacuum valve 62 has two positions: in a first position, as shown in FIG. 1 for device 3, the vacuum line 63 is uncoupled from the container 10, i.e. there is no vacuum in the container 10. In a second position of the vacuum valve 62, the container 10 is fluidically coupled with the vacuum line 63 and there is a vacuum in the interior of the container 10.

Particles of dirt in the air which has been sucked up can be filtered out in the settling container 64 to protect the vacuum pump 65. The water separator 66, for example an electrostatic separator removes the water from the air, sucked up out of the container 10, which water is possibly contaminated with hydraulic fluid (or with additives thereof).

Furthermore, a control means 67 is provided which is connected in terms of signalling with all the switchable elements 15, 16, 17, 24, 34, 62, 48, 35, 54 and 65 to control them and is connected in terms of signalling with all the signal-emitting elements 18, 22, 33, 23, 32, 37, 38, 68 and 69 to evaluate signals therefrom (the electrical lines have not been shown for reasons of clarity). The control means 67 is preferably configured as a flexibly programmable SPC (stored-program control).

The control means 67 is preferably connected to an indicator 73 (see also FIG. 3), on which, for example measured values, the different operating states of the individual devices 3 to 6 or also warning signals, for example that a filter should be replaced, can be displayed.

Figure 3:
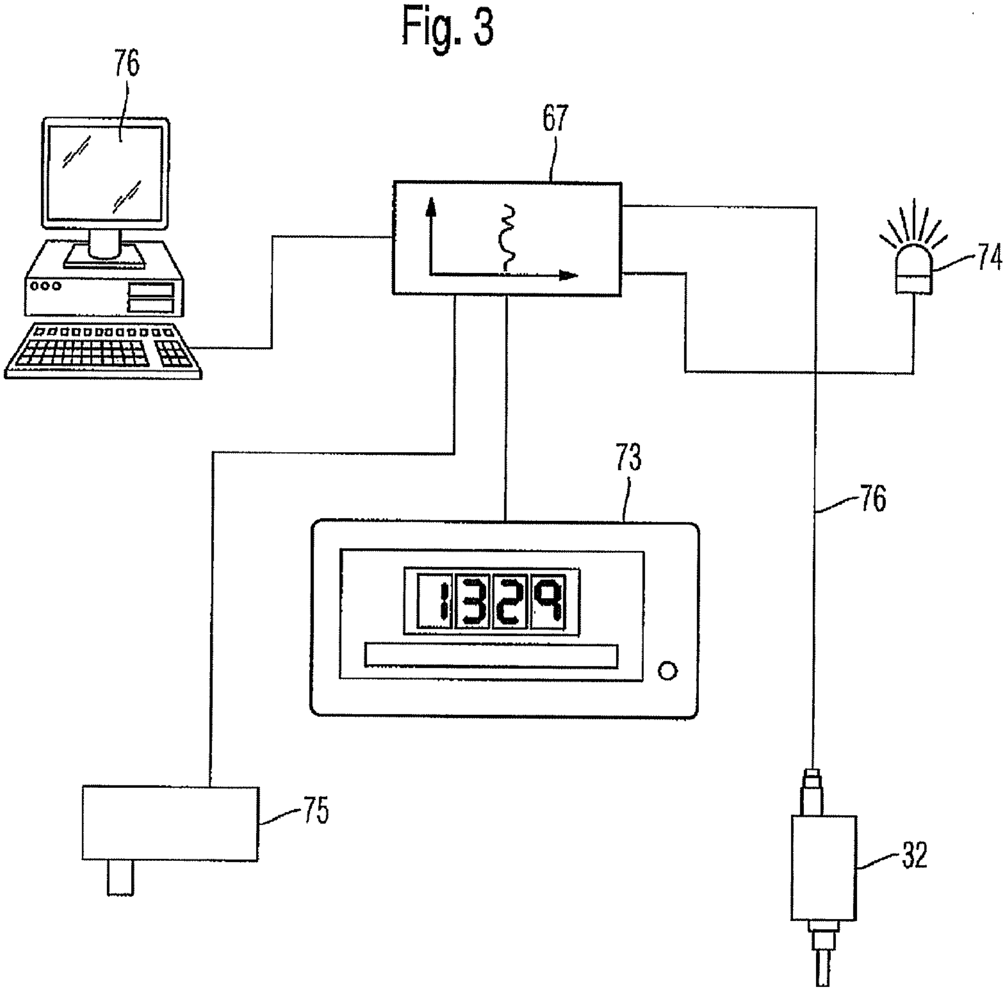
FIG. 3 schematically shows a circuit diagram according to the embodiment.

The circuitry of the control means 67 is shown schematically in FIG. 3. By way of example, the control means 67 is connected to the moisture sensor 32. Furthermore, the control means is connected to the indicator 73 which has already been mentioned. The control means 67 is also connected to a warning light 64 to warn an operator of the unit 1. The control means 67 powered by a plug power pack 75 can be programmed flexibly by a PC (personal computer) 76 which, for example, allows the input of various limiting values for the permissible water content of the hydraulic fluid, which values can differ for different types of aircraft, for example.

Of course, each of the devices 3 to 6 could have a respective compressed air line 53, vent line 56, vacuum line 63 and control means 67 (with respectively associated components), however, according to the present embodiment, in order to economise on parts, devices 3 to 6 are provided with a common compressed air line 53, vent line 56, vacuum line 63 and control means 67.

Figures 4, 5:
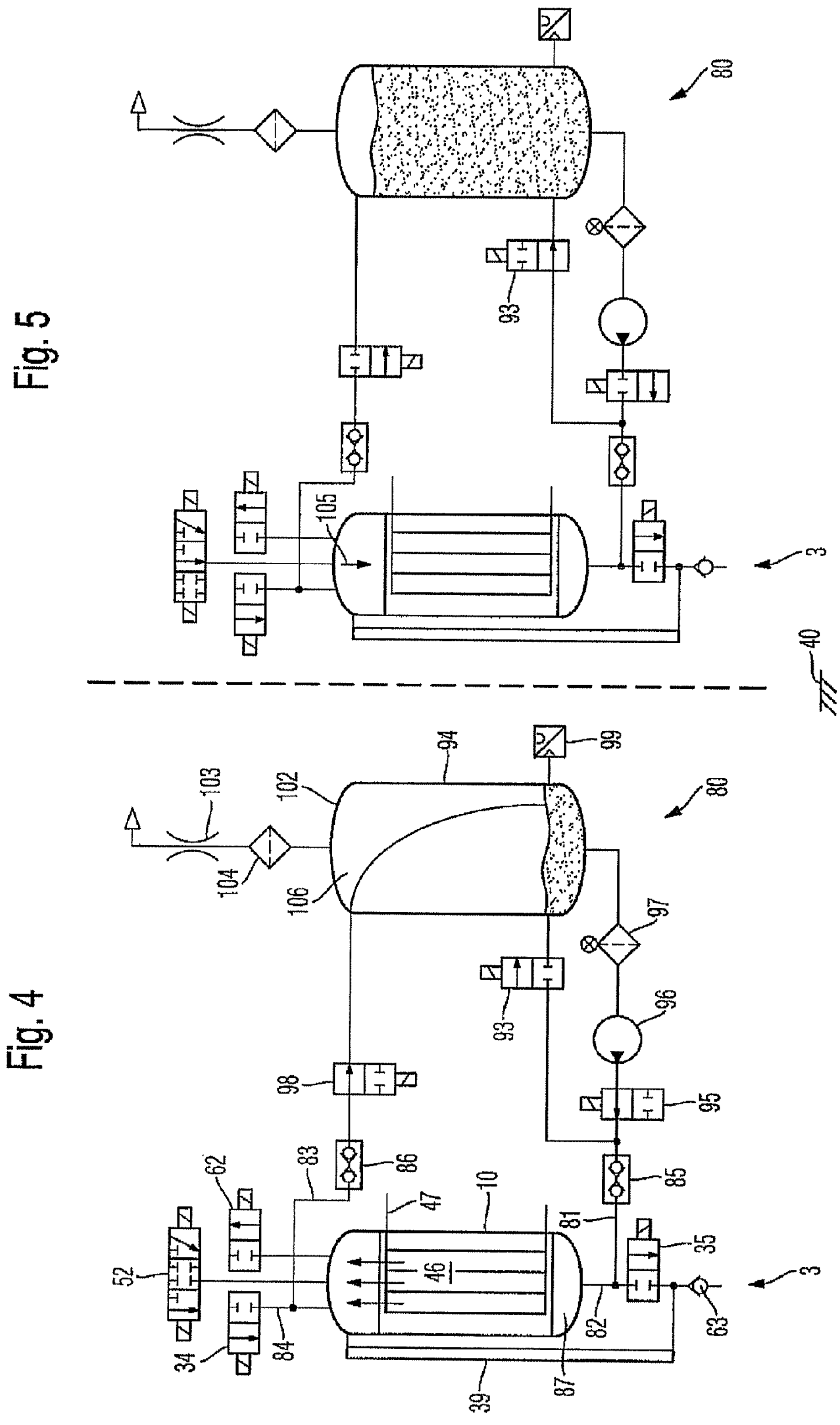
FIG. 4 shows one of the devices of FIG. 1 with an associated cleaning means according to the embodiment, the cleansing agent flowing through the container.
FIG. 5 shows the arrangement of FIG. 4, the cleansing agent having been emptied out of the container.

In FIGS. 4 and 5, the device 3 is shown supplemented by a cleaning means 80. Of course, each device 3 to 6 can have a cleaning means 80 of this type.

A cleansing agent feed 81 is fluidically coupled with the line portion 82 connecting the return valve 35 to the container 10 and a cleansing agent return 83 is fluidically coupled with the line portion 84 connecting the feed valve 34 to the container 10.

Provided in the cleansing agent feed 80 or in the cleansing agent return 83 are firstly respective stop valves 85, 86 which, in the closed state, ensure that no cleansing agent 87 penetrates unintentionally into the lines 82, 84.

A discharge line 92 preferably branches off from the cleansing agent feed 81 downstream of the stop valve 85, it being possible for said discharge line 92 to be fluidically coupled with a cleansing agent container 94 by a discharge valve 93 configured as an electromagnetically actuatable 2/2 directional control valve.

Downstream of the discharge line 92, the cleansing agent feed 81 has a cleansing agent feed valve 95 configured as an electromagnetically actuatable 2/2 directional control valve, a cleansing agent pump 96 and preferably a cleansing agent filter 97 with a contamination indication, downstream of which the cleansing agent feed 81 opens into the cleansing agent container 94.

Provided in the cleansing agent return 83, downstream of the stop valve 86 is a cleansing agent return valve 98 which is configured as an electromagnetically actuatable 2/2 directional control valve, downstream of which the cleansing agent return 83 opens into the container 94.

The cleansing agent container 94 is also oriented substantially vertically to the ground 40 and has at its upper end 102 a ventilation 103 above a filter 104.

Each device 3 to 6 can now be operated in the types of operation as listed in the following: in a dewatering mode, see FIG. 1, device 3; in an emptying operation associated with a re-drying mode, see FIG. 1, device 4; in a re-drying operation associated with the regenerating mode, see FIG. 1, device 5; and in a filling operation associated with the regenerating mode, see FIG. 1, device 6.

In the dewatering mode shown for device 3 in FIG. 1, the hydraulic fluid flows from the hydraulic system 2 by the effect of the pump 16 through the feed 11 into the container 10 and there flows through the sorbent 46 which removes water from the hydraulic fluid. Thereupon, the hydraulic fluid flows out of the container 10 into the return 12 and then returns into the hydraulic system 2.

During this procedure, the moisture sensors 32, 33 are constantly measuring the water content in the hydraulic fluid. The moisture sensor 32 provides the control means 67 with the measured water content in the feed as a measured value MZ and the moisture sensor 33 provides said control means with the water content measured in the return as a measured value MR.

The control means 67 compares the measured value MR with a limiting value G1 which is, for example 0.45% water content and is thus just below the maximally permissible water content in the hydraulic fluid of 0.5%.

If the control means 67 then establishes that the measured value MR is above the limiting value G1, it decides that the sorbent 46 no longer has an adequate sorption capacity for permanently keeping the water content of the hydraulic fluid below 0.5%, i.e. the maximally permissible value. The control means 67 then switches device 1 into the regenerating mode and, in this mode, initiates the emptying operation, as shown for device 4 in FIG. 1.

Additionally or alternatively, it can be provided that the control means 67 constantly determines the value of the difference BD between the measured value MR and the measured value MZ and compares this value BD with a limiting value G2. The limiting value G2 is preferably calculated as a function of the measured value MZ. In this respect, the limiting value G2 is a value, to be expected, of the difference with a sorbent 46 of a "normal" sorption capacity. These values can be recorded in a table, for example.

In addition, the flow rate DR, indicated by the flow sensor 23, can also be used in determining the limiting value G2, because the flow rate influences the value, to be expected, of the difference between the measured values MZ and MR; for example with a high flow rate, the active time of the sorbent 46 on the hydraulic fluid is reduced. Therefore, a lower difference value will be expected.

If the control means then establishes that the value BD is above the value G2, it likewise switches the device into the regenerating mode and, in so doing, initially switches into the emptying operation, as shown in FIG. 1 for device 4. The second calculation method allows an earlier prediction that the sorption capacity of the sorbent 46 is exhausted.

For the emptying operation, the control means 67 closes the feed 11 by means of the feed valve 34 and connects the compressed air valve 52 such that compressed air flows from the compressed air line 53 into the container 10. In so doing, the hydraulic fluid in the container 10 is discharged by the compressed air 105 into the return 12 through the open return valve 35. The lower filling level sensor 38 indicates to the control means 67 when the container 10 is completely empty and even when a portion of line 43 is empty. This ensures that the container 10 is completely empty.

The control means 67 then again switches the compressed air valve 52 such that no further compressed air flows from the compressed air line 53 into the container 10. The control means 67 then closes the return valve 35 so that the container 10 is no longer fluidically coupled with the return 12.

Thereafter, the control means 67 switches into re-drying operation, switching the vacuum valve 62 such that the container 10 is connected to the vacuum line 63 and there is a vacuum in the container. The vacuum evaporates the water absorbed by the sorbent 46 and the water escapes through the vacuum valve 62 and line 63.

The control means 67 also switches the switch 48 such that current flows through the heating elements of the heating means 47 and the sorbent is heated. This measure further stimulates the evaporation of the water absorbed in the sorbent 46. By means of the pressure MD measured by the pressure sensor 68 in the vacuum line, the control means 67 constantly calculates the temporal change in pressure MDZ and compares this with a limiting value for the change in pressure GD. When the value MDZ falls below the value GD, it is then established that the amount of water absorbed in the sorbent 46 has fallen to a desired (low) content. Thereupon, the heating means 47 is disconnected again by switching the switch 48 and the vacuum valve 62 is reclosed.

There is then the possibility of again cleaning the sorbent 46, i.e. to free the sorbent from particles of dirt incorporated therein from the hydraulic fluid. Whether the device is switched into a cleaning operation of this type can take place, for example on the basis of a measured value which is indicated to the control means 67 by the filter 22 and which reflects the extent to which the hydraulic fluid is contaminated with particles of dirt. If the degree of contamination exceeds a predetermined limiting value, the control means 67 can decide to switch into the cleaning operation.

In the cleaning operation, the stop valves 85, 86 (see FIGS. 4 and 5) and the cleansing agent feed valve 95 and the cleansing agent return valve 98 are opened. The discharge valve 93 is closed.

The control means 67 then starts up the pump 96 and the cleansing agent 87 is circulated through the sorbent 46, as a result of which particles of dirt are flushed out of the sorbent 46. The flushed out particles of dirt are in turn filtered out of the cleansing agent 87 by the filter 97. After a certain amount of time, when it can be assumed that the sorbent 46 is clean, the control means 67 switches off the pump 96 again, closes the cleansing agent feed valve 85 and the cleansing agent return valve 98 and opens the discharge valve 93, as shown in FIG. 5.

The control means 67 then switches the compressed air valve 52 such that compressed air 105 flows from the compressed air line 53 into the container 10 and, in so doing, discharges the cleansing agent 87 out of the container 10 into the cleansing agent feed 81 (see FIG. 5), the cleansing agent 87 then being discharged through the discharge line 92 and through the open discharge valve 93 into the cleansing agent container 94 and it displaces the air 106 present in the cleansing agent container 94 out of the cleansing agent container 94 through the filter 104 and the ventilation 103. The compressed air valve 52 is re-closed so that no more compressed air flows into the container 10 when it is established that all the cleansing agent 87 has been displaced out of the container 10. A suitable sensor (not shown) can be provided for this purpose.

If the measured signal which is made available by the cloudiness sensor 99 to the control means 67 and indicates a cloudiness of the cleansing agent 87 exceeds a limiting value for the permitted cloudiness of the cleansing agent, the cleansing agent 87 can be replaced at this time.

Hereafter or, if it is established that a cleaning operation is unnecessary, directly after the re-drying operation, the control means 67 switches into the filling operation and opens the feed valve 34 and switches the compressed air valve 52 such that the container 10 is connected to the vent line 56, whereupon the hydraulic fluid flows out of the feed 11 into the container 10 and displaces the compressed air 105 in the container 10 out of said container into the vent line 56 through the filter 57 and ventilation 58 (shown in FIG. 1 for device 6).

If the level 45 of the hydraulic fluid in the container 10 rises to a specific level, it activates the filling level sensor 37 and the filling level sensor 37 indicates to the control means 67 that the container is full again.

Thereupon, the control means 67 switches device 3 back into dewatering mode, in which the hydraulic fluid is again dewatered by means of the sorbent 46.

The control means 67 only switches devices 3 to 6 alternately into the dewatering mode, emptying operation, re-drying operation and filling operation. This means that when device 3 is in dewatering mode, device 4 is in emptying operation, device 5 is in re-drying operation and device 6 is in filling operation (see FIG. 1).

It is conceivable to provide a further device according to the invention, in which case the control means 67 only switches devices 3 to 6 and the other device alternately into dewatering mode, emptying operation, re-drying operation, cleaning operation and filling operation.

Although the present invention has been described on the basis of a preferred embodiment, it is not restricted thereto, but can be modified in many different ways.

LIST OF REFERENCE NUMERALS

1 unit
2 hydraulic system
3 device
4 device
5 device
6 device
10 container
11 feed
12 return
13 connection
14 connection
15 stop valve
16 stop valve
17 hydraulic pump
18 filter
22 filter
23 flow sensor
24 pressure reducing valve
25 nonreturn valve
26 flow direction
27 safety line
28 safety line
29 upper end
30 lower end
32 moisture sensor
32*a* capacitive probe
32*b* temperature probe
33 moisture sensor
34 feed valve
35 return valve
36 nonreturn valve
37 filling level sensor
38 filling level sensor
39 measuring column
40 ground
43 line
44 level
45 level
46 sorbent
47 heating means
48 switch
52 compressed air valve
53 compressed air line
54 compressor
55 filter
56 vent line
57 filter
58 ventilation
62 vacuum valve
63 vacuum line
64 settling container
65 vacuum pump
66 separator
68 pressure sensor
69 filling level sensor
73 indication
74 warning light
75 plug power pack
76 line
80 cleaning means
81 cleansing agent feed
82 line
83 cleansing agent return
84 line
85 stop valve
86 stop valve
87 cleansing agent
92 discharge line
93 discharge valve
94 cleansing agent container
95 cleansing agent feed valve
96 cleansing agent filter
98 cleansing agent return valve
99 cloudiness sensor
103 ventilation
104 filter
105 compressed air
106 compressed air
BD difference value
DR measured flow rate
G1 limiting value
G2 limiting value
GD pressure limiting value
MDZ change in pressure
MD measured pressure
MZ measured water content in feed
MR measured water content in return

The invention claimed is:

1. A method for dewatering a hydraulic fluid of a hydraulic system of an aircraft, the hydraulic fluid being passed through a sorbent which is in a container and which removes water from the hydraulic fluid, the water content of the hydraulic fluid being measured before and/or after passing through the sorbent, and, if the measured water content is above a first limiting value, a regenerating mode being initiated for regenerating the sorbent and thus for reproducing the sorption capacity of the sorbent, wherein in the regenerating mode, the sorbent is separated from the hydraulic fluid in an emptying operation and the sorbent is then re-dried in a re-drying operation.

2. The method according to claim 1, wherein in the emptying operation of the regenerating mode, a feed valve is closed and a compressed air valve is opened, the hydraulic fluid being discharged by compressed air out of the container into a return through an open return valve, and wherein in the emptying operation, the compressed air valve is closed again when a filling level sensor indicates that the hydraulic fluid has been emptied out of the container.

3. The method according to claim 1, wherein in the re-drying operation, the sorbent is re-dried by heat and/or reduced pressure, wherein the re-drying operation is carried out under at least reduced pressure and the end of the re-drying operation is determined by the pressure falling below a limiting value for the change in pressure, wherein in the re-drying operation, the return valve is closed and the vacuum valve is opened, the sorbent being re-dried by the vacuum momentarily prevailing in the container, and wherein in the re-drying operation of the regenerating mode, the return valve is closed, a ventilating valve is opened and a heating element is connected for supplying heat to the sorbent to re-dry said sorbent.

4. The method according to claim 2, wherein in a filling operation downstream of the re-drying operation, of the regenerating mode, a ventilating valve and the feed valve are opened to fill the container with the hydraulic fluid, wherein in the filling operation, the ventilating valve is re-closed and the return valve is opened when a filling level sensor indicates a desired filling level, and wherein the device is then switched again into the dewatering mode from the regenerating mode.

5. The method according to claim 4, wherein after the re-drying operation and before the filling operation, the device is switched into a cleaning operation to remove dirt from the sorbent if the degree of contamination exceeds a contamination limiting value, the cleansing agent feed and thus the cleansing agent return valve being opened and a cleansing agent flowing through the sorbent and, in so doing, dirt is removed from the sorbent, wherein the cleansing agent is circulated by a cleansing agent pump through the container, a cleansing agent return, a cleansing agent container a filter and a cleansing agent feed in the cleaning operation, dirt being filtered out of the cleansing agent by a filter, and wherein in the cleaning operation after the cleansing agent has been circulated, to empty said cleansing agent out of the container the cleansing agent return valve is closed and the compressed air valve is opened, the cleansing agent being discharged into the cleansing agent feed by compressed air.

6. The method according to claim 5, wherein for emptying the container, a cleansing agent discharge valve is opened and the cleansing agent feed valve or the cleansing agent return valve is closed, and wherein the filter is replaced when a contamination indication of said filter indicates that the filter is contaminated.

7. The method according to claim 1, wherein after the regenerating mode, the hydraulic fluid is passed through the sorbent again.

* * * * *